United States Patent
Lee et al.

(10) Patent No.: US 8,081,801 B2
(45) Date of Patent: Dec. 20, 2011

(54) DEVICE AND METHOD FOR CONTROLLING STREETLIGHTS

(75) Inventors: Hou-Hsien Lee, Taipei Hsien (TW);
Chang-Jung Lee, Taipei Hsien (TW);
Chih-Ping Lo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 7 days.

(21) Appl. No.: 12/853,247

(22) Filed: Aug. 9, 2010

(65) Prior Publication Data
US 2011/0235857 A1   Sep. 29, 2011

(30) Foreign Application Priority Data
Mar. 23, 2010   (TW) ................................ 99108593 A

(51) Int. Cl.
*G06K 9/00* (2006.01)
*G09F 13/00* (2006.01)

(52) U.S. Cl. .......................................... 382/104; 40/557
(58) Field of Classification Search .................. 382/104; 340/555, 641, 918, 982; 701/25, 93, 201, 701/202, 211; 40/557
See application file for complete search history.

(56) References Cited

U.S. PATENT DOCUMENTS 6,119,065 A * 9/2000 Shimada et al. .............. 701/201
6,246,948 B1 * 6/2001 Thakker .......................... 701/93

* cited by examiner

*Primary Examiner* — Abolfazl Tabatabai
(74) *Attorney, Agent, or Firm* — Altis Law Group, Inc.

(57) ABSTRACT

A method for controlling streetlights located at a streetlight control area using a streetlight power control system controls an image capturing device to capture digital images of at least one route section of the streetlight control area at a predetermined interval. Light of a streetlight corresponding to the streetlight power controller is automatically adjusted by turning on or off the streetlight and by increasing or decreasing the intensity of the streetlight.

15 Claims, 4 Drawing Sheets

DEVICE AND METHOD FOR CONTROLLING STREETLIGHTS

BACKGROUND

1. Technical Field

Embodiments of the present disclosure relate generally to streetlight management systems and methods, and more particularly to a device and method for controlling streetlights.

2. Description of Related Art

Streetlights are located on the edge of roads, intersections and widely used in parks as well as parking lots of both rural and urban areas. Power consumption of the streetlights depends on operational intensity and operation time of each streetlight of a streetlight distribution system. Power consumption costs are difficult to manage because traditional methods of streetlight operations are either having the streetlight on or off.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
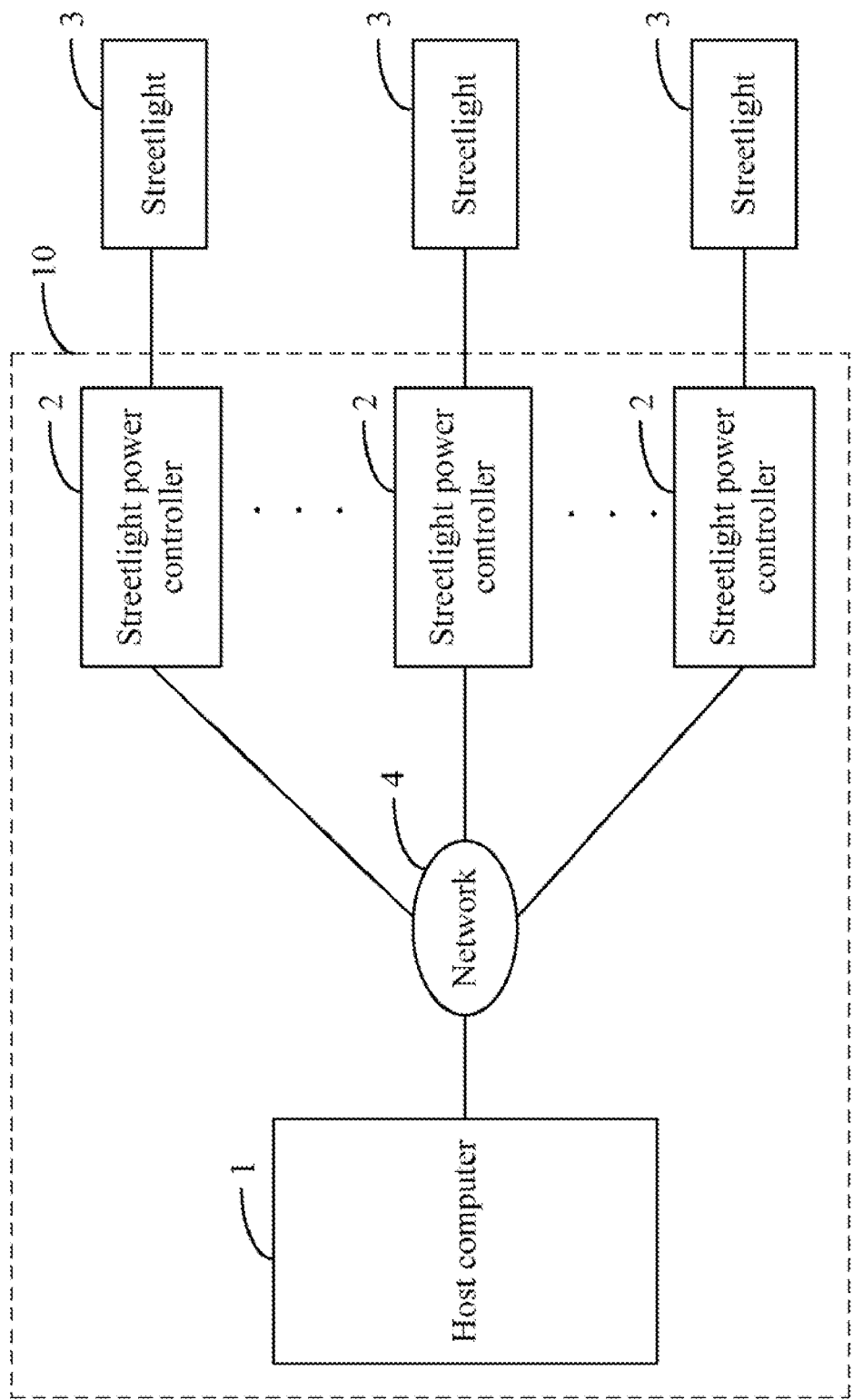
FIG. 1 is a schematic diagram of one embodiment of a streetlight power control system.

FIG. 1 is a schematic diagram of one embodiment of a streetlight power control system 10. In the embodiment, the streetlight power control system 10 includes a host computer 1, and a plurality of streetlight power controllers 2. Each of the streetlight power controllers 2 connects to a streetlight 3 through electrical wires, and connects to the host computer 1 through a network 4 such as a wide area network (WAN), a local area network (LAN), or any other suitable communication network. Each of the streetlight power controllers 2 is located at different positions of a streetlight control area 20 (shown in FIG. 4), and corresponds to each of the streetlights 3. In one example with respect to FIG. 4, the streetlight control area 20 may include a plurality of route sections, such as route section "AB," route section "BC," route section "BH," and route section "NO," for example. Each of the route sections includes a first terminal and a second terminal. For example, the terminal "A" is the first terminal of the route section "AB," and the terminal "B" is the second terminal of the route section "AB." One streetlight power controller 2 and one corresponding streetlight 3 are located at each terminal of each rout section. For example, the terminal position "A" of the route section "AB" has one streetlight power controller 2 and the corresponding streetlight 3, and the terminal position "B" of the route section "AB" has one streetlight power controller 2 and the corresponding streetlight 3.

The host computer 1 stores streetlight configuration of the streetlight control area 20, and allocates an internet protocol (IP) address to each of the streetlight power controllers 2 according to a position of the corresponding streetlight 3. In one example with respect to FIG. 4, the IP address of the streetlight power controllers 2 located at the terminal position "A" may be "10.11.121.01", and the IP address of the streetlight power controllers 2 located at the terminal position "O" may be "10.11.121.15". In one embodiment, the streetlight configuration may include terminal positions of different route sections in the streetlight control area 20, and a route distance defining the distance between positions of the two terminals of each of the route sections. Each of the streetlight power controllers 2 controls the corresponding streetlight 3 to power on or off, and automatically adjusts the intensity of the corresponding streetlight 3 by increasing or decreasing the intensity of the corresponding streetlight 3.

Figure 2:
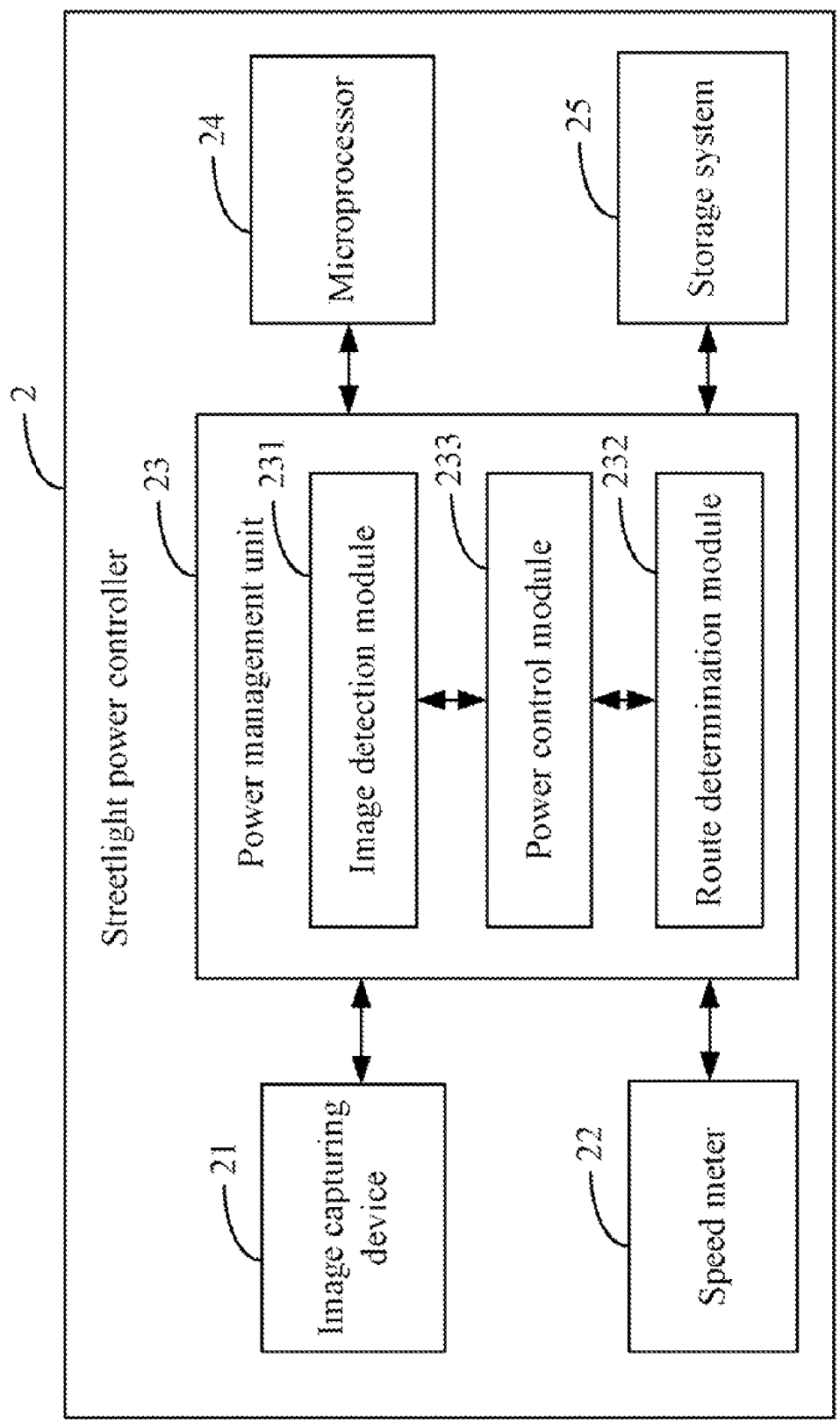
FIG. 2 is a schematic diagram of one embodiment of a streetlight power controller included in the streetlight power control system of FIG. 1.

FIG. 2 is a schematic diagram of one embodiment of the streetlight power controller 2 included in the streetlight power control system 10. In the embodiment, the streetlight power controllers 2 includes an image capturing device 21, a speed meter 22, a power management unit 23, at least one microprocessor 24, and a storage system 25. It should be apparent that FIG. 2 illustrates only one example of a streetlight power controller 2 and may include more or fewer components than illustrated, or a different configuration of the various components in other embodiments.

The image capturing device 21 is operable to capture digital images of one or more route sections of the streetlight control area 20 at a predetermined interval, and to send the digital images to the power management unit 23. The predetermined interval may be defined as one or two seconds. In one embodiment, the image capturing device 21 may be a digital camera, or a video camera capable of capturing digital images day or night. The speed meter 22 is capable of detecting a speed of a moving object approaching the first terminal of the route section. The moving object may be a car or a person, for example.

The power management unit 23 may include a plurality of functional modules including one or more computerized instructions that are stored in the storage system 25. The storage system 25 may be an internal storage device, such as a random access memory (RAM) for temporary storage of information, and/or a read only memory (ROM) for permanent storage of information. The storage system 25 may also be an external storage device, such as a hard disk, a storage card, or a data storage medium. The microprocessor 24 runs various software modules stored in the storage system 25 to manage each of the streetlights 3 distributed in the streetlight control area 20.

In one embodiment, the power management unit 23 includes an image analysis module 231, a route determination module 232, and a power control module 233. One or more computerized codes of the function modules 231-233 may be stored in the storage system 24 and executed by the at least one microprocessor 24. In general, the word "module," as used herein, refers to logic embodied in hardware or firmware, or to a collection of software instructions, written in a programming language. The software instructions in the modules may be embedded in firmware, such as an erasable programmable read only memory (EPROM). The modules described herein may be implemented as either software and/or hardware modules and may be stored in any type of computer-readable medium or other storage device.

The image analysis module 231 is operable to detect whether a moving object approaches the first terminal of the route section basing on the digital images received from image capturing device 21. In addition, the image analysis module 231 is further operable to determine the second terminal of the route section based on movement of the moving object from the digital images. In one example with respect to FIG. 4, if the moving object approaches the terminal "A", the image analysis module 231 determines that the second terminal is "B." If the moving object approaches the first terminal "B," the image analysis module 231 determines that the second terminal may be "C" or "H."

The route determination module 232 is operable to control the speed meter 22 to detect a speed of the moving object upon the condition that the moving object approaches the first terminal In addition, the route determination module 232 is operable to obtain a route distance between the first terminal and the second terminal of the route section from the host computer 1 through the network 4. In some embodiments, the route distance is obtained according to the IP address of the streetlight power controller 2 belonging to the route section. The route determination module 232 is further operable to calculate an estimated departure time of the moving object depart from the first terminal and an estimated arrival time of the moving object arriving at the second terminal based on the speed of the moving object and the route distance of the route section.

In response to the estimated departure time, the power control module 233 is operable to automatically adjust the intensity of a corresponding streetlight 3 of the first terminal of the route section on the estimated departure time. In one embodiment, the power control module 233 may turn off the corresponding streetlight 3 of the first terminal or to decrease the intensity of the corresponding streetlight 3 of the first terminal on the estimated departure time.

In response to the estimated arrival time of the second terminal, the power control module 233 is further operable to inform the streetlight power controller 2 of the second terminal to automatically adjust the intensity of the corresponding streetlight 3 of the second terminal on the estimated arrival time. In one embodiment, the power control module may turn on the corresponding streetlight 3 of the second terminal or to increase the intensity of the corresponding streetlight 3 of the second terminal on the estimated arrival time.

Figure 3:
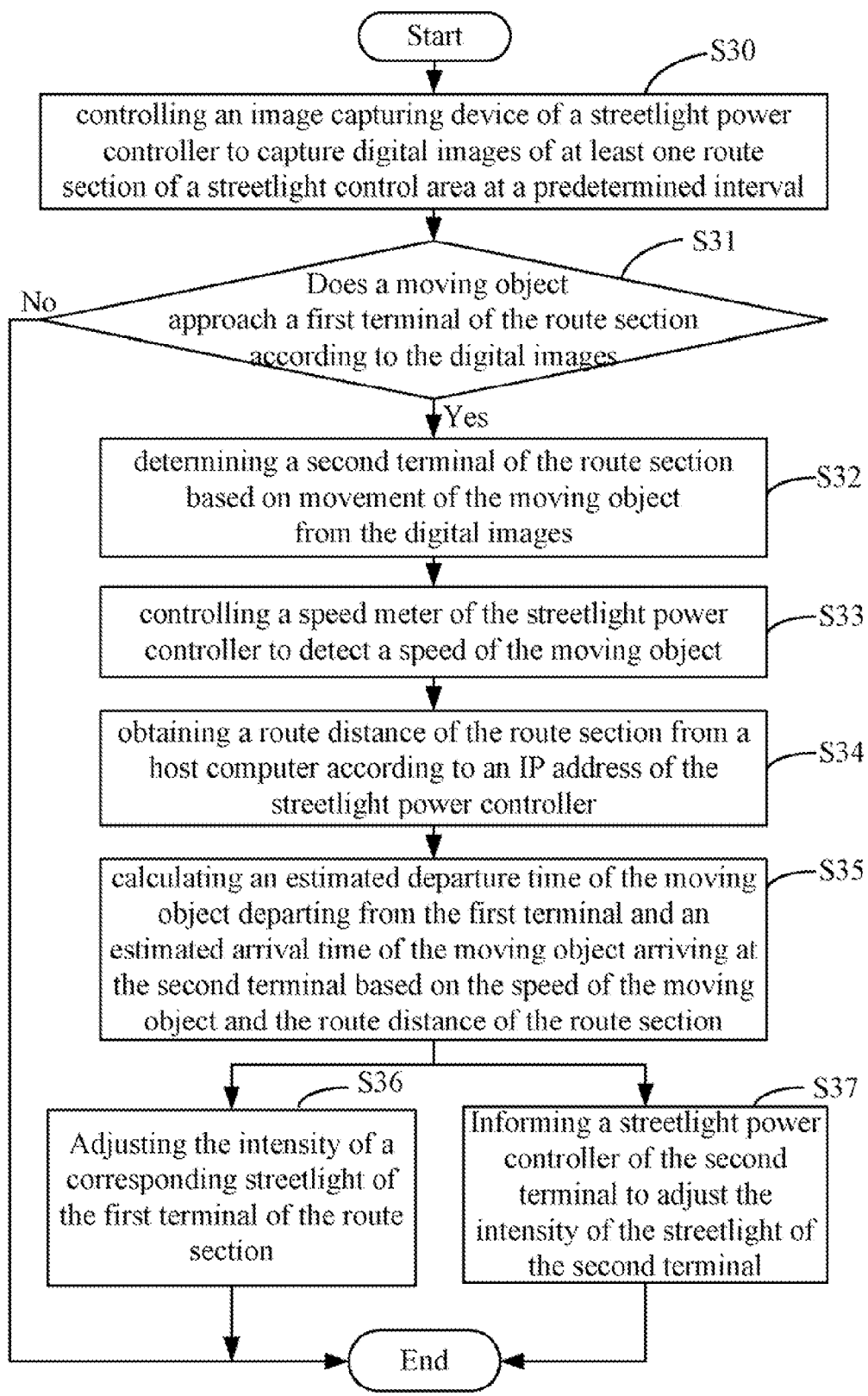
FIG. 3 is a flowchart of one embodiment of a method for controlling streetlights using the system of FIG. 1.

FIG. 3 is a flowchart of one embodiment of a method for controlling streetlights using the system 10 of FIG. 1. In the embodiment, the method can manage the streetlights 3 distributed in the streetlight control area (shown in FIG. 4) by turning on/off the streetlights 3, and by increasing or decreasing the intensity of the streetlights 3, so as to control power consumption of each of the streetlights 3. Depending on the embodiment, additional blocks may be added, others removed, and the ordering of the blocks may be changed.

In block S30, the image analysis module 231 controls the image capturing device 21 to capture digital images of one or more route sections of the streetlight control area 20 at a predetermined interval, and sends the digital images to the power management unit 23. The predetermined interval may be defined as one or two seconds.

In block S31, the image analysis module 231 detects whether a moving object approaches the first terminal of the route section by analyzing the digital images. If the moving object approaches the first terminal of the route section, in block S32, the image analysis module 231 determines the second terminal of the route section based on movement of the moving object from the digital images. In one example with respect to FIG. 4, if the moving object approaches a first terminal "A" of a route section, the terminal "B" may be determined as a second terminal of the route section. If the moving object approaches a first terminal "B" of another route section, the terminal "C" or "H" may be determined as a second terminal of the route section.

In block S33, the route determination module 232 controls the speed meter 22 to detect a speed of the moving object approaching the first terminal of the route section. In block S34, the route determination module 232 obtains a route distance of the first terminal and the second terminal of the route section from the host computer 1 through the network 4. In some embodiments, the route distance is obtained according to an IP address of the streetlight power controller 2 belonging to the route section. In one example with respect to FIG. 4, if the IP address of the streetlight power controller 2 located at the terminal "A" may be "10.11.121.01", the route determination module 232 obtains the route distance from the host computer 1 according to the IP address "10.11.121.01" of the streetlight power controller 2.

In block S35, the route determination module 232 calculates an estimated departure time of the moving object departing from the first terminal and an estimated arrival time of the moving object arriving at the second terminal based on the speed of the moving object and the route distance of the route section.

In block S36, the power control module 233 automatically adjust the intensity of a corresponding streetlight 3 of the first terminal of the route section on the estimated departure time. In one embodiment, the power control module 233 may turn off or decrease the intensity of the corresponding streetlight 3 of the first terminal on the estimated departure time.

In block S37, the power control module 233 informs the streetlight power controller 2 of the second terminal to automatically adjust the intensity of the corresponding streetlight 3 of the second terminal on the estimated arrival time. In one embodiment, the power control module may turn on or increase the intensity of the corresponding streetlight 3 of the second terminal on the estimated arrival time.

Figure 4:
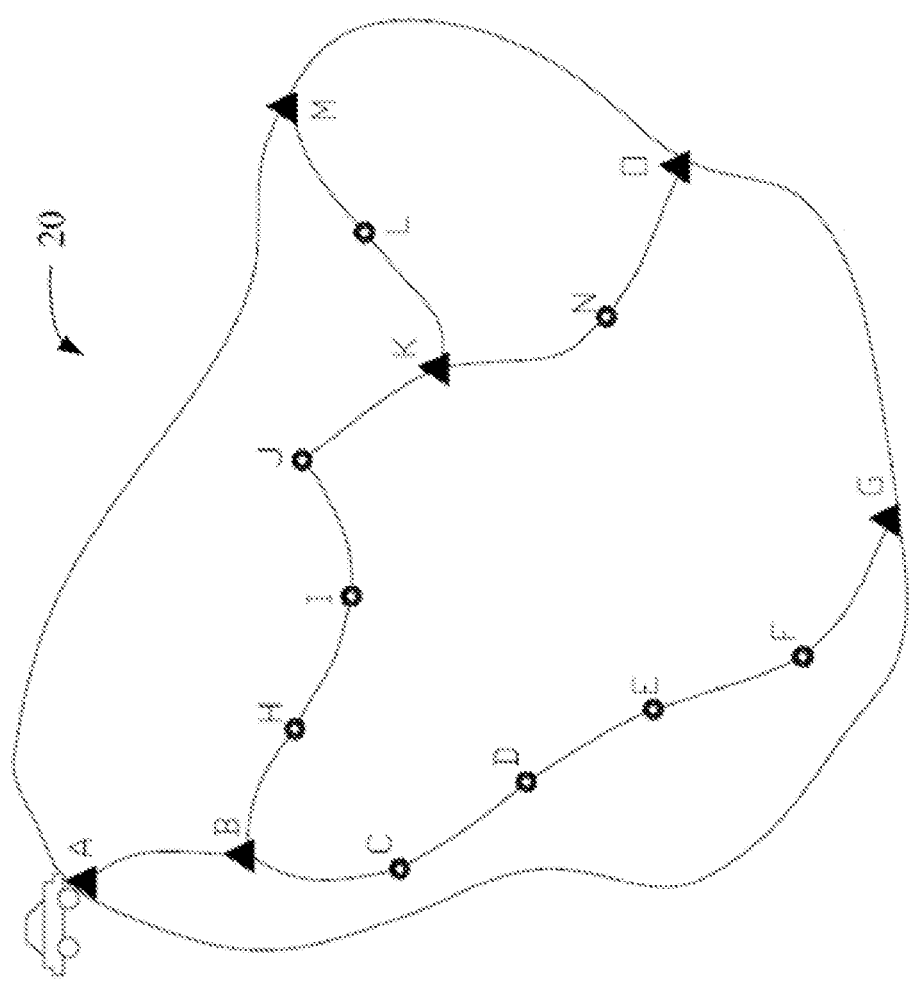
FIG. 4 shows a schematic diagram illustrating one example of positions of streetlights located in a streetlight control area.

In one example with respect to FIG. 4, when a car approaches to the terminal position "A," the power control module 233 turns on the streetlights 3 of the first positions "A." When the car approaches to the terminal position "B," the power control module 233 decreases the intensity of the streetlights 3 of the terminal position "A," and increases the intensity of the streetlights 3 located at the terminal position "B." When the car arrives at the terminal position "B," the power control module 233 may turn off the streetlight 3 located at the position terminal "A," and turn on the streetlight 3 of the terminal position "C" or "H."

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A streetlight power controller, comprising:
an image capturing device operable to capture digital images of at least one route section of a streetlight control area at a predetermined interval, the route section comprising a first terminal and a second terminal;
a speed meter, a storage system, and at least one processor; and
a power management unit stored in the storage system and executable by the at least one processor, the power management unit comprising:
an image analysis module operable to detect whether a moving object approaches the first terminal of the route section, and to determine the second terminal of the route section based on movement of the moving object from the digital images;

a route determination module operable to control the speed meter to detect a speed of the moving object, and to calculate an estimated departure time of the moving object departing from the first terminal and an estimated arrival time of the moving object arriving at the second terminal based on the speed of the moving object and a route distance of the route section; and a power control module operable to automatically adjust the intensity of a corresponding streetlight of the first terminal of the route section on the estimated departure time.

2. The streetlight power controller according to claim 1, wherein the power control module is further operable to turn off the streetlight of the first terminal or to decrease the intensity of the streetlight of the first terminal on the estimated departure time.

3. The streetlight power controller according to claim 1, wherein the power control module is operable to inform the streetlight power controller of the second terminal to automatically adjust the intensity of a corresponding streetlight of the second terminal on the estimated arrival time.

4. The streetlight power controller according to claim 3, wherein the power control module is further operable to turn on the streetlight of the second terminal or to increase the intensity of the streetlight of the second terminal on the estimated arrival time.

5. The streetlight power controller according to claim 1, wherein the image capturing device is a digital camera or a video camera for capturing the digital images in day or night.

6. A method for controlling streetlights located in a streetlight control area, each of the streetlights connecting to a streetlight power controller, the method comprising:

controlling an image capturing device of the streetlight power controller to capture digital images of at least one route section of the streetlight control area at a predetermined interval, the route section comprising a first terminal and a second terminal;

detecting whether a moving object approaches the first terminal of the route section from the digital images;

determining the second terminal of the route section based on movement of the moving object from the digital images upon the condition that the moving object approaching the first terminal;

controlling a speed meter of the streetlight power controller to detect a speed of the moving object;

calculating an estimated departure time of the moving object departing from the first terminal and an estimated arrival time of the moving object arriving at the second terminal based on the speed of the moving object and a route distance of the route section; and automatically adjusting the intensity of a corresponding streetlight of the first terminal of the route section on the estimated departure time.

7. The method according to claim 6, wherein the corresponding streetlight of the first terminal is adjusted by turning off the streetlight of the first terminal or decreasing the intensity of the streetlight of the first terminal.

8. The method according to claim 6, further comprising:
informing the streetlight power controller of the second terminal to automatically adjust the intensity of a corresponding streetlight of the second terminal on the estimated arrival time.

9. The method according to claim 8, wherein the corresponding streetlight of the second terminal is adjusted by turning on the streetlight of the second terminal or increasing the intensity of the streetlight of the second terminal on the estimated arrival time.

10. The method according to claim 6, wherein the host computer stores positions of terminals of the route sections in the streetlight control area, and the route distances of the route sections.

11. A non-transitory storage medium having stored thereon instructions that, when executed by a least one microprocessor of a streetlight power controller, causes the streetlight power controller to perform a method for controlling streetlights located in a streetlight control area, each of the streetlights connecting to a streetlight power controller, the method comprising:

controlling an image capturing device of the streetlight power controller to capture digital images of at least one route section of the streetlight control area at a predetermined interval, the route section comprising a first terminal and a second terminal;

detecting whether a moving object approaches the first terminal of the route section from the digital images;

determining the second terminal of the route section based on movement of the moving object from the digital images upon the condition that the moving object approaching the first terminal;

controlling a speed meter of the streetlight power controller to detect a speed of the moving object;

calculating an estimated departure time of the moving object departing from the first terminal and an estimated arrival time of the moving object arriving at the second terminal based on the speed of the moving object and a route distance of the route section; and automatically adjusting the intensity of a corresponding streetlight of the first terminal of the route section on the estimated departure time.

12. The storage medium according to claim 11, wherein the corresponding streetlight of the first terminal is adjusted by turning off the streetlight of the first terminal or decreasing the intensity of the streetlight of the first terminal.

13. The storage medium according to claim 11, wherein the method further comprises:
informing the streetlight power controller of the second terminal to automatically adjust the intensity of a corresponding streetlight of the second terminal on the estimated arrival time.

14. The storage medium according to claim 13, wherein the corresponding streetlight of the second terminal is adjusted by turning on the streetlight of the second terminal or increasing the intensity of the streetlight of the second terminal on the estimated arrival time.

15. The storage medium according to claim 11, wherein the host computer stores positions of terminals of the route sections in the streetlight control area, and the route distances of the route sections.

* * * * *